(12) United States Patent
Bodziony et al.

(10) Patent No.: US 10,311,053 B2
(45) Date of Patent: *Jun. 4, 2019

(54) EFFICIENT PROCESSING OF DATA EXTENTS

(71) Applicant: INTERNATIONAL BUSINESS MACHINES CORPORATION, Armonk, NY (US)

(72) Inventors: Michal Bodziony, Tegoborze (PL); Andreas Brodt, Gerlingen (DE); Lukasz Gaza, Jankowice (PL); Artur M. Gruszecki, Cracow (PL); Tomasz Kazalski, Balice (PL); Konrad K. Skibski, Zielonki (PL)

(73) Assignee: International Business Machines Corporation, Armonk, NY (US)

( * ) Notice: Subject to any disclaimer, the term of this patent is extended or adjusted under 35 U.S.C. 154(b) by 283 days.

This patent is subject to a terminal disclaimer.

(21) Appl. No.: 15/249,509

(22) Filed: Aug. 29, 2016

(65) Prior Publication Data

US 2018/0060386 A1 Mar. 1, 2018

(51) Int. Cl.
*G06F 7/00* (2006.01)
*G06F 17/30* (2006.01)
*G06F 16/2453* (2019.01)
*G06F 16/242* (2019.01)

(52) U.S. Cl.
CPC .... *G06F 16/24534* (2019.01); *G06F 16/2425* (2019.01)

(58) Field of Classification Search
CPC ......... G06F 17/30333; G06F 17/30575; G06F 17/30592; G06F 17/30117; G06F 17/30312; G06F 17/30424; G06F 16/24534; G06F 16/2425
See application file for complete search history.

(56) References Cited

U.S. PATENT DOCUMENTS

| | | |
|---|---|---|
| 8,775,766 B2 | 7/2014 | LeGendre et al. |
| 8,880,837 B2 | 11/2014 | Dudgeon et al. |
| 9,141,648 B1 | 9/2015 | Birnbaum et al. |
| 2015/0095299 A1 | 4/2015 | Dickie et al. |

(Continued)

OTHER PUBLICATIONS

IBM: List of IBM Patents or Patent Applications Treated as Related (Appendix P), May 1, 2018, pp. 1-2.

(Continued)

*Primary Examiner* — Azam M Cheema
(74) *Attorney, Agent, or Firm* — Michael O'Keefe

(57) ABSTRACT

The present disclosure relates to a computer-implemented method, computer program product, and computer system, for optimization of query processing a set of data extents on which a table is stored. Attribute value information may be maintained for each data extent. The attribute value information indicate as ranges the minimum and maximum values of an attribute of the entries stored in the respective extent. A first metric of a first data extent of the set may determine splitting the first data extent into sub-extents increases query processing efficiency. A second metric of a second data extent and a third data extent may determine merging the second data extent and the third data extent increases query processing efficiency.

12 Claims, 5 Drawing Sheets

(56) References Cited

U.S. PATENT DOCUMENTS

2015/0286681 A1 10/2015 Baer et al.
2018/0096029 A1* 4/2018 Bodziony ......... G06F 17/30395

OTHER PUBLICATIONS

Disclosed Anonymously, "Protection of terms for bundled products by installer controller", An IP.com Prior Art Database Technical Disclosure, IP.com No. IPCOM000241559D, IP.com Electronic Publication Date: May 11, 2015, 3 pages.
IBM Knowledge Center, "Merge of Extents for the Same Table", Version 12.1, Printed on Jun. 8, 2016, IBM® Informix® 12.10, 1 page.

* cited by examiner

EFFICIENT PROCESSING OF DATA EXTENTS

BACKGROUND

The present invention relates to the field of digital computer systems, and more specifically, to a method for optimization of query processing of data extents.

Analytical database systems manage very large amounts of data and are optimized for queries that may read large portions of the database. Query performance in analytical databases is dependent on an amount of data to be processed. In order to achieve good query performance, a reorganization of the data should be run frequently, at least every time a significant number of rows has been inserted into a table. However, frequent reorganizations incur high costs, with respect to both central processing unit (CPU) and input/output (I/O) loads, and required temporary working memory and disk storage.

SUMMARY

Various embodiments provide a method, a computer system, and a computer program product for optimization of query processing of data extents, as described by the subject matter of the independent claims. Embodiments are described in the dependent claims. Embodiments of the present invention can be freely combined with each other if they are not mutually exclusive.

An aspect of the present invention relates to a computer-implemented method for optimization of query processing of data extents. The method includes storing entries of a table on a set of data extents, maintaining attribute value information for each data extent, the attribute value information indicating as ranges the minimum and maximum values of at least one attribute of the entries stored in the respective extent, determining for at least a first data extent of the set, a first metric reflecting whether splitting the first data extent into first sub-extents would increase query processing efficiency using the attribute value information, determining for at least two data extents of the set, a second metric reflecting whether merging the at least two data extents would increase query processing efficiency using the attribute value information, splitting and/or merging the first data extent and the at least two data extents based on the determined first and second metric values, and adapting the attribute value information accordingly.

Another aspect of the present invention relates to a computer program product including a computer-readable storage medium having computer-readable program code embodied therewith, the computer-readable program code configured to implement all of steps of the method according to preceding embodiments.

An additional aspect of the present the invention relates to a computer system for optimization of query processing of data extents. The computer system is configured for storing entries of a table on a set of data extents, maintaining attribute value information for each data extent, the attribute value information indicating as ranges the minimum and maximum values of at least one attribute of the entries stored in the respective extent, determining for at least a first data extent of the set, a first metric reflecting whether splitting the first data extent into first sub-extents would increase query processing efficiency using the attribute value information, determining for at least two data extents of the set, a second metric reflecting whether merging the at least two data extents would increase query processing efficiency using the attribute value information, splitting and/or merging the first data extent and the at least two data extents based on the determined first and second metric values, and adapting the attribute value information accordingly.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
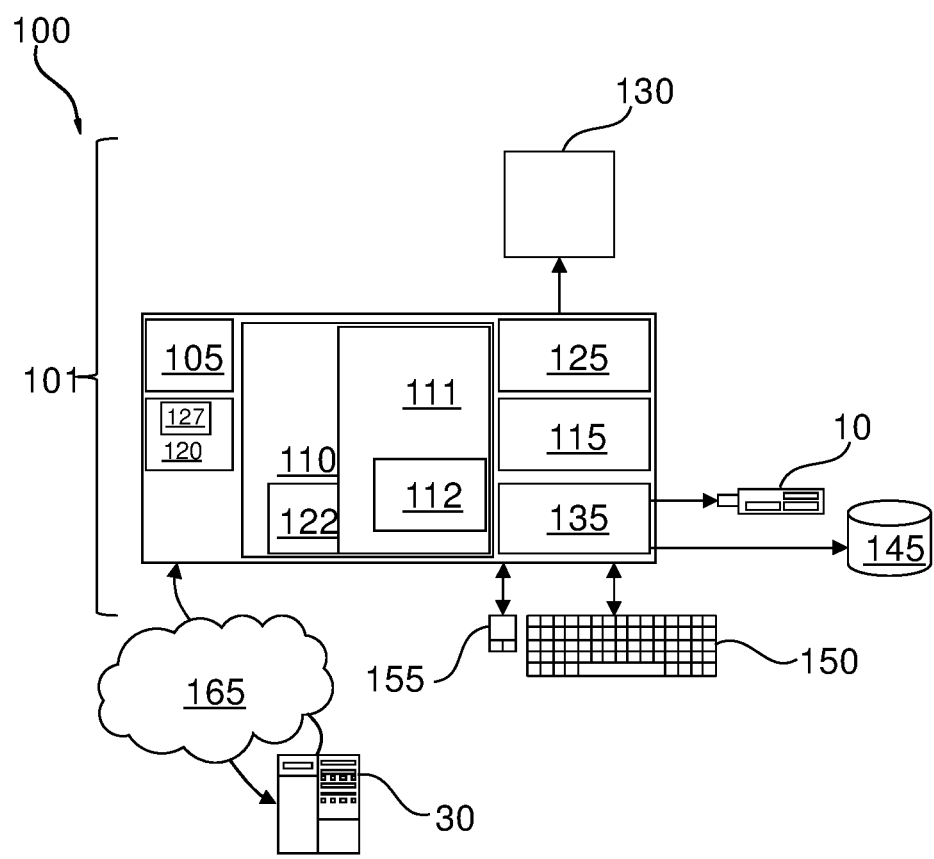
FIG. 1 represents a computer system, suited for implementing one or more method steps as involved in the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

The present method may have the advantage of controlling the number of extents in order to optimize the query execution performance. The present method may for example be automatically be performed, e.g. on a periodic basis, or as soon as a new data extents are stored or defined. In another example, the present method may be performed in response to receiving a request e.g. from a user.

The present method may be a key performance enabler for analytical database systems, as it may require disk I/O and CPU resources than conventional methods.

Attribute value information may be descriptive of an attribute. Using the attribute value information a preselection of extents may be performed before scanning the preselected extents. The attribute value information may include information or metadata on the attribute that allows such a preselection. In an example, the attribute value information may include at least one of the following: minimum attribute value of the attribute in the extent, maximum attribute value of the attribute of the extent.

For example, the maximum and the minimum attribute values define a first range of values of the attribute in a respective extent. For example, a received data query may require a second range of values of the attribute. The processing of the data query may include selecting extents whose respective first range overlaps with the second range, and processing those selected extents.

The term "extent" as used herein may refer to a logical or physical storage unit (e.g. contiguous area of storage) for storing data of a data table. The extent may be a storage unit that is handled by a database management system or an operating system of a computer system. The extent may for example be the smallest or second smallest storage unit in a hierarchy of storage units used by a database, e.g. involving segments and pages.

Using attribute value information associated with each extent, a query may be processed by first determining a scan list of extents that may satisfy the query. The attribute value information may be used. For example, if the query condition is "AGE<18", then the attribute value information may be used to exclude or skip extents that have a minimum attribute value which is higher than or equal to 18, etc.

The attribute value information may include multiple attributes. For example, an evaluation of the first and second metrics may make use of multiple attributes, e.g. an overlap ranges as defined below may be checked for each of the multiple attributes, and if at least one does not satisfy a merging/splitting condition as described below, the merging and/or splitting may not be performed. In another example, first (second) metric values of the multiple attributes may be combined, e.g. using a linear weighting method, and a resulting combined value may be used to decide whether to split (merge) the first extent (at least two extents). Furthermore, query execution efficiency may be determined based on the multiple attributes, e.g. using queries involving conditions on the multiple attributes.

According to an embodiment, the first metric includes a portion of entries in a first data extent that was read by one or more previous queries, and performing splitting if the portion is smaller than a predefined portion threshold. For example, the portion may be determined for a given time period that precedes a time at which an evaluation of the first metric is performed. This embodiment may be advantageous as it may reduce a number of unnecessary scanned records. For example, after splitting the first data extent into two or more first sub-extents, a resulting sub-extents may be scanned partially to scan the portion of records, as the portion of records may be located only on one or on few of the first sub-extents. This may increase the query execution performance of queries on the data extents. The splitting may, for example, be performed to obtain sub-extents with equal number of records, or may be performed as described below using a clustering algorithm. In another example, the splitting may randomly be performed by assigning to each sub-extent a respective number of records.

According to an embodiment, the splitting of the first data extent is performed such that the portion of read entries is stored in a single sub-extent of the first sub-extents. This embodiment may be advantageous as it may further reduce the number of unnecessary scanned records as the portion of relevant records may be located only on a single sub-extent.

According to an embodiment, the first metric includes the frequency of read access of the first data extent, and performing the splitting if the frequency is higher than a predefined frequency threshold. This embodiment may be advantageous as it may reduce a number of unnecessary scanned records. For example, after splitting the first data extent into two or more first sub-extents, the resulting sub-extents may only scanned in part as a probability of excluding or skipping extent from the scanning stage may be high for sub-extents. This may increase the query execution performance of queries on the data extents.

According to an embodiment, the method further includes monitoring how often the data extents were scanned by previous queries, resulting in a first set of data extents that have frequency of read access higher than a given threshold and a second set of data extents that have frequency of read access lower than the given threshold. The determining of the first data extent further including selecting the first data extent among the first set of data extents, and the determining of the at least two extents including selecting the at least two extents among the second set of data extents. This may further increase the scanning or query execution performance by splitting and merging in accordance with an additional condition being the read access frequency.

According to an embodiment, the second metric includes the frequency of read access of the at least two data extents, and performing the merging if the frequency of read access of each data extent of the at least two extents is smaller than a predefined frequency threshold. This embodiment may increase the query execution performance of queries on the data extents, by reducing the number of unnecessary scanned extents.

According to an embodiment, the method further includes performing the merging only if the overlap range of the ranges of the values of the attribute of the at least two extents is higher than a predefined range. By using multiple conditions or a combination of two metrics namely the frequency and the overlap range, this embodiment may further increase the query execution performance of queries on the data extents, by reducing the number of unnecessary scanned extents.

According to an embodiment, the second metric includes the overlap range of the ranges of the values of the attribute in the at least two extents, and performing the merging only if the overlap range of the ranges of the values of the attribute of the at least two extents is higher than a predefined range.

According to an embodiment, the second metric includes the frequency of read access of each data extent of the at least two data extents, the merging being performed if the difference between the read access frequencies of the at least two extents is smaller than a predefined maximum value. For example, the at least two extents may have frequencies lower than the predefined frequency threshold. Although, the at least extents may have frequencies lower than the predefined frequency threshold checking that their frequencies are similar may be advantageous as it may avoid merging extents which are far away from each other in term frequencies which may increase the number of unnecessary scanned extents. An unnecessary scanned extent may be an extent that is selected as a candidate extent using the attribute value information; however no records have been found satisfying the query condition. A candidate extent may be an extent which may or may not contain records that satisfy the query condition.

According to an embodiment, the splitting is performed based on a statistical analysis using values of the at least one attribute of the entries of the first data extent. This may provide an accurate splitting of extents which may increase the query performance as described above.

According to an embodiment, the data extents are defined in accordance with a hierarchical data structure, the at least two extents form a data container having a hierarchy level higher than the hierarchy level of the at least two extents, wherein the data container is associated with attribute value information indicating the minimum and maximum values of the at least one attribute in the data container, the merging including deleting the attribute value information of the at least two extents. This may save storage space required for attribute value information of the merged extents and may reduce the number of extents to be scanned.

According to an embodiment, the method further includes changing the hierarchy level of the data container to an extent hierarchy level. This may enable a seamless integration of the present method in existing systems that use predefined hierarchies involving the extents one of the storage units.

Referring now to FIG. 1, a general computer system (hereinafter "system") 100, suited for implementing method steps as involved in the disclosure, in accordance with an embodiment of the present invention, is shown.

It will be appreciated that the methods described herein are at least partly non-interactive, and automated by way of computerized systems, such as servers or embedded systems. In exemplary embodiments, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. A system 100 may include a general-purpose computer 101.

In exemplary embodiments, in terms of hardware architecture, as shown in FIG. 1, the computer 101 includes the processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which includes an ordered listing of executable instructions for implementing logical functions, notably functions involved in embodiments of this invention. In the example of FIG. 1, software in the memory 110 includes the software 112, e.g. instructions to manage databases such as a database management system. The memory 110 may further include a query optimizer. The query optimizer may include instructions, e.g. software instructions, that when executed may provide a query execution plan for executing a given query.

The software in memory 110 shall also typically include a suitable operating system (OS) 111. The OS 111 may essentially control the execution of other computer programs, such as the software 112 for implementing methods as described herein.

The methods described herein may be in the form of a source program, executable program (object code), script, any other entity including a set of instructions, or the software 112 to be performed. When in the form of a source program, the source program may need to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In an embodiment, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In an embodiment, the system 100 can further include a network interface for coupling to a network 165. The network 165 can be an IP-based network for communication between the computer 101 and an external server, client and the like via a broadband connection. The network 165 may transmit and receive data between the computer 101 and an external system 30, which can be involved to perform part or all of the steps of the methods discussed herein. In an embodiment, the network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include the software 122, for example, a basic input output system (BIOS). The BIOS is a set of essential software routines that initializes and test hardwares at startup, starts the OS 111, and supports the transfer of data among the hardware devices. The BIOS may be stored in ROM, and the BIOS can be executed when the computer 101 is activated.

When the computer 101 is in operation, the processor 105 may be configured to execute the software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may include a disk storage such as HDD storage.

The system 100 may have access to at least one data table (or data set) 127. For example, the software 112 may receive (automatically or upon request) as input the data table 127, or may download the data table 127 from a source system that is e.g. connected to the system 100. For simplification purpose, the data table 127 is shown as part of storage 120 but it can be stored in memory 110 or any other storage to which the system 100 has access.

Figure 2:
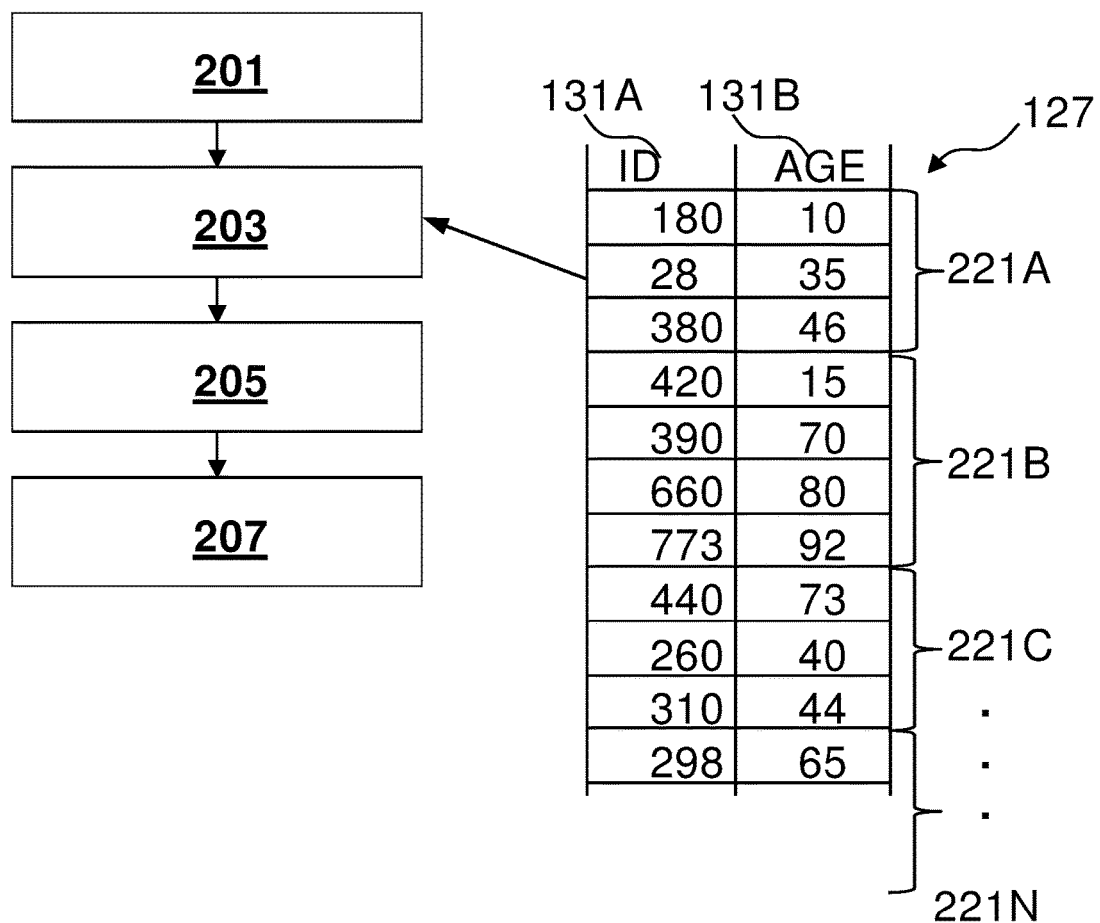
FIG. 2 is a flowchart of a method for optimization of query processing of data extents.

Referring now to FIG. 2, a flowchart of a method for optimization of query processing of data extent, in accordance with an embodiment of the present invention, is shown.

The data table 127, as also shown in FIG. 1, may include one or more columns 131A-B, wherein each column is represented by a respective attribute (e.g. "ID" 131A and "Age" 131B). The rows or records of the data table 127 may include values of the attributes.

The term "data table" or data set as used herein refers to a collection of data that may be presented in tabular form. Each column in the data table may represent a particular variable or attribute. Each row in the data table may represent a given member, record or entry of the data table.

While data table 127 shows two attributes, it will be appreciated that numerous attributes may exist or may be used.

FIG. 2 shows a flowchart of a method for optimization of query processing of the data extents 221A-N e.g. entries of data table 127, as shown in FIG. 2, may be stored or divided into the data extents. Each data extent 221A-N may be assigned attribute value information. The attribute value information may indicate as ranges the minimum and maximum values of at least one attribute of the entries stored in the respective data extent. For example, the data extent 221A may have attribute value information that indicates a minimum value 10 of the attribute 131B and a maximum value 46 of the attribute 131B. The minimum and maximum values define a range of values of the attribute e.g. [10, 46]. The attribute value information of a data extent may include a minimum and maximum value of each attribute of at least one of the attributes of the data table 127.

In step 201, a first metric may be determined or evaluated for at least a first data extent of the data extents 221A-N to obtain one or more first metric values. In an example, the first metric may be evaluated for each data extent of at least part of the data extents 221A-N. The at least part of the data extents 221A-N may be defined as described below (e.g. first set of data extents described below).

In another example, the first data extent may be randomly selected among the data extents 221A-N. In an additional example, the first data extent may be user defined.

The first metric indicates or reflects whether splitting the first data extent into first sub-extents would increase query processing efficiency or query processing performance using the attribute value information. In other words, processing a given query on the first data extent before splitting would be less efficient or less performant compared to the processing of the same query on the first sub-extents.

For exemplification purpose, assuming that the first data extent has attribute value information indicating a range of values of the attribute 131B which is [10, 50] and if split into two, the resulting first sub-extents may have the ranges [10, 30] and [30, 50], respectively. Thus, a query having a condition "AGE<30" when processed after splitting the first data extent would only scan the first sub-extent having the range [10, 30] (because the other first sub-extent does not contains any entry that would satisfy the query as indicated by the attribute value information [30,50]). This may make the query processing faster compared to processing the whole first data extent [10, 50] before splitting, as the query has to scan more entries in the first data extent compared to the first sub-extent.

In an example, the first metric may include a portion of entries or records in the first data extent that was read by one or more previous queries. For example, the portion may be evaluated for a predefined time period by monitoring one or more queries. During the predefined time period, one or more queries may be received that may be executed on the first data extent. For each of those queries it may be determined which records or entries of the first data extents that were relevant for the query. In case the portion that is effectively used or that it is relevant for the received queries is small this may be an indication that the splitting of the first data extent may be beneficial. For example, the splitting of the first data extent may be performed such that the portion of read entries is stored in a single sub-extent of the first sub-extents.

Let's assume the first data extent consists of 1000 entries or records. If a high number of queries scanned the first data extent and only found (on average) 10 rows in the first data extent that matched the respective query predicates, then portion of relevant rows is 1%. This means that 990 rows or 99% was read unnecessarily. The present method may minimize the number of rows read unnecessarily. In this case, the first data extent may be split up into smaller first data sub-extents. If, for example, the first data extent is split into two smaller first sub-extents of 500 rows each, then there is a certain probability that many queries only need to read one of the two smaller first sub-extents to find the relevant 10 rows. Thus, the portion of relevant rows for these queries has doubled. If on the other hand, a high number of queries scanned z and found on average 990 relevant rows, the portion of relevant rows is 99%. In this case the first data extent may not be split up into smaller first sub-extents.

In another example, the first metric includes the frequency of read access of the first data extent. For example, it may be determined using queries e.g. on a given time period how often the first data extent is accessed (or needed) e.g. for read or write access. If the first data extent is frequently accessed this may be an indication that splitting the first data extent would be beneficial.

In step 203, a second metric may be determined or evaluated for at least two data extents of the data extents 221A-N to obtain one or more second metric values. In an example, the second metric may be evaluated for each possible combination of two or more data extents of at least part of the data extents 221A-N. The at least part of the data extents 221A-N may be defined as described below (e.g. the second set of data extents described below).

In another example, the at least two data extents may be randomly selected among the data extents 221A-N. In another example, the at least two data extents may be user defined.

The second metric indicates or reflects whether merging the at least two data extents would increase query processing efficiency or performance using the attribute value information. In other words, processing a given query on the at least two data extents before merging would be less efficient or less performant compared to the processing of the same query on the resulting merged data extent.

In an example, the second metric includes the frequency of read access of the at least two data extents. For example, it may be determined using queries e.g. on a given time period how often the at least two data extents are accessed (or needed) e.g. for read or write access. If the at least two data extents are not frequently accessed this may be an indication that merging the at least two data extents would be beneficial.

In another example, the second metric includes the overlap range of the ranges of the values of the attribute in the at least two extents. For example, the range of values of the attribute 131B of one of the two data extents is [10, 50] and the other data extent has a range of values of the attribute 131B which is [20, 60]. In this case, the overlap range is [20, 50] which is high enough to merge the two data extents. For example, queries having e.g. condition "AGE<30" would scan both data extents separately. By merging them, the access to a single data extent may be more performant than accessing multiple data extents e.g. two data extents. For example, the merging may lead to less entries of attribute value information (e.g., instead of having two entries for attribute value information of the two extents to be merged, only one entry may be used for attribute value information of the merged extent). This may reduce the search space. For example, query planning time may be reduced because the determination of the scan list of extents to be scanned uses less entries in order to define the scan list.

In step 205, the first data extent may (or may not) be split based on the determined one or more first metric values. The at least two data extents may (or may not) be merged based on the determined one or more second metric values.

For example, the splitting may be performed if the portion defined above is smaller than a predefined portion threshold (e.g. 10%). In another example, the splitting may be performed if the determined access frequency to the first data extent is higher than a predefined frequency threshold.

In an example, the merging may be performed if the frequency of read access of each data extent of the at least two extents is smaller than a predefined frequency threshold. The predefined frequency threshold used for splitting may or may not be the same frequency threshold for the merging.

In another example, the merging may be performed if the frequency of read access of each data extent of the at least two extents is smaller than the predefined frequency threshold and if the overlap range of the ranges of the values of the attribute of the at least two extents is higher than a predefined range. For example, if data extents 221A-B are identified to be merged because their access frequency is smaller the predefined frequency threshold they may be merged if the overlap between the range of attribute values of the data extent 221A and 221B is higher than the predefined range.

The merging may, for example, be performed taking into account the data extents involved in the combinations. For example, if the second metric value evaluated for the combination of data extents 221A-B indicates that the data extents 221A-B to be merged, and that the second metric value evaluated for another possible combination of data extents e.g. 221A-C indicates the data extents 221A-B to be merged, in this case one selected combination of the two combinations which is to be merged i.e. either 221A-C or 221A-B as they involve a same data extent 221A. In an example, the selected combination may be randomly chosen among the combinations 221A-C or 221A-B. In another example, the selected combination may be the combination e.g. 221A-C that provides better query processing performance.

In step 207, the attribute value information may be adapted according to the splitting and merging that occurred in step 205. For example, if the first data extent is split into two first sub-extents, then attribute value information of the first data extent is deleted and two attribute value information are created for the two first sub-extents. In another example, if two data extents e.g. 221A-B are merged, the attribute value information of each of data extents 221A and 221B may be deleted and a new attribute value information may be generated or created for the merged data extent resulting from the merging of the data extents 221A-B.

Figure 3:
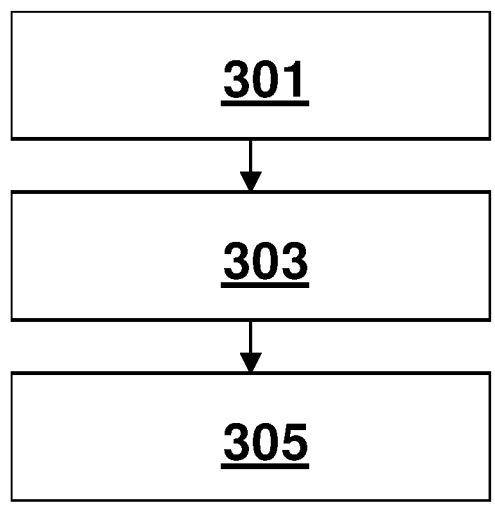
FIG. 3 is a flowchart of a method for evaluating metrics on data extents.

Referring now to FIG. 3, a flowchart of a method for evaluating metrics on data extents, in accordance with an embodiment of the present invention, is shown.

FIG. 3 is a flowchart of a method further detailing steps 201 and 203. In step 301, two sets of data extents may be generated or derived from the data extents 221A-N. A first set of data extents may include the data extents having the access frequency higher than a first frequency threshold and a second set of data extents may include the data extents having the access frequency smaller than a second frequency threshold. The first and second frequency may or may not be the same.

In step 303, step 201 is performed using the first data extent from the first set of data extents. In an example, the first metric may be evaluated for each data extent of the first set of data extents.

In another example, the first data extent may be randomly selected among the first set of data extents. In another example, the first data extent may be user defined among the first set of data extents.

In step 305, step 203 is performed using the at least two data extents from the second set of data extents. In an example, the second metric may be evaluated for each possible combination of two or more data extents of the second set of data extents.

In another example, the at least two data extents may be randomly selected among the second set of data extents. In another example, the at least two data extents may be user defined among the second set of data extents.

Figure 4:
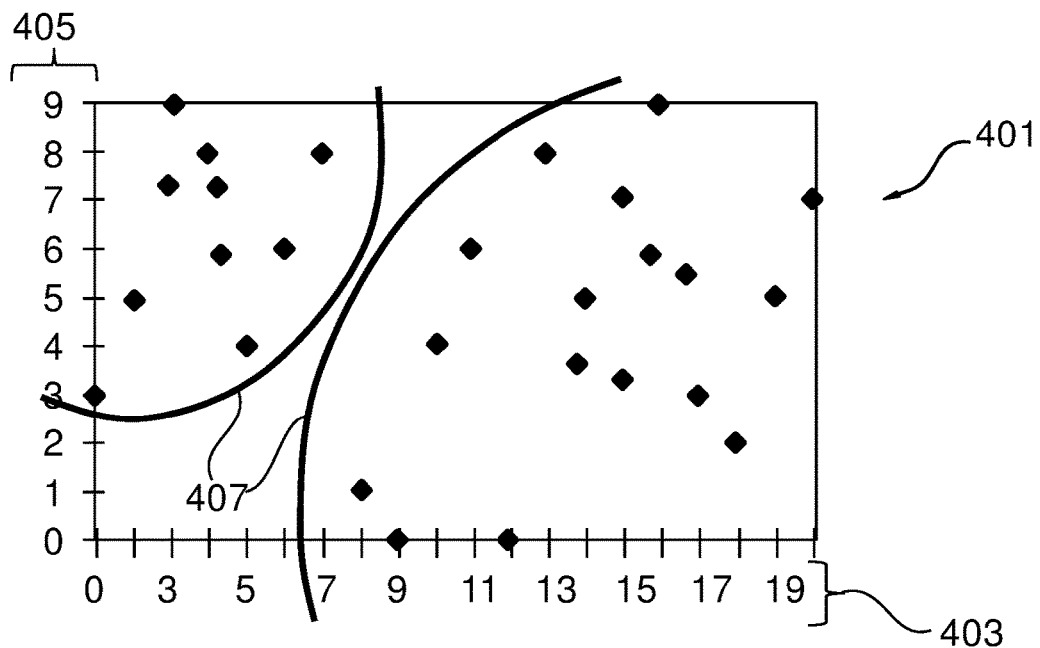
FIG. 4 illustrates a method for splitting and merging data extents.
Figure 4:
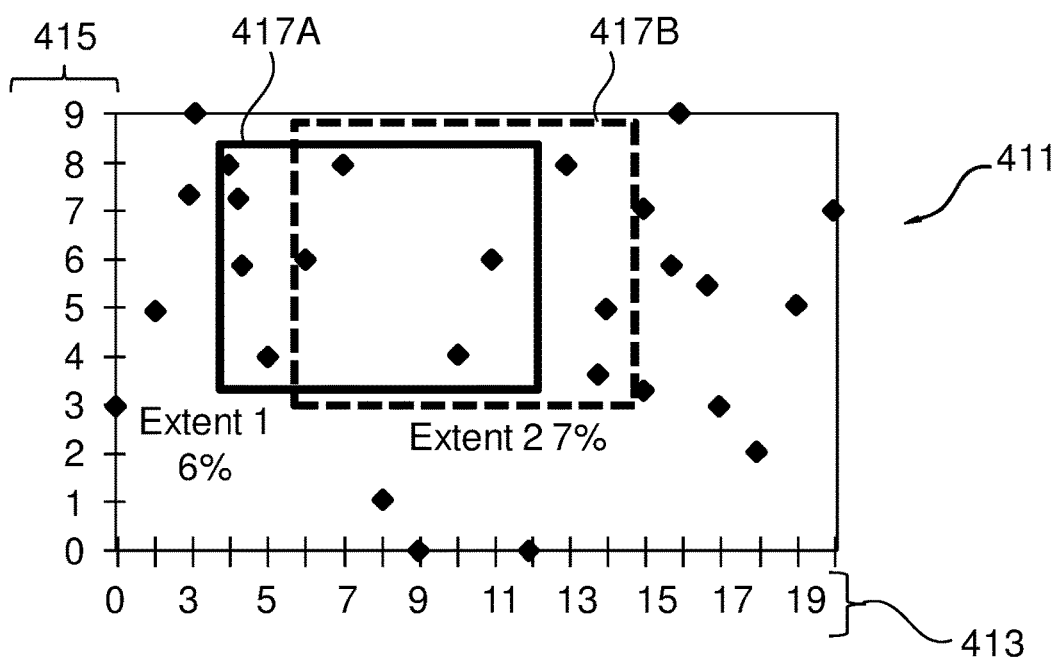

Referring now to FIG. 4, a method for splitting and merging data extents, is shown. In this example, two attributes are used in order to decide to split or merge data extents of the data extents 221A-N. Graph 401 shows correlation between attribute values 403 of the first attribute and attribute values 405 of the second attribute of data records of a given extent. The data records shown in graph 401 belong to a single extent while data records of graph 411 belong to multiple extents.

The first attribute has a range of values [1, 20] that varies from 1 to 20, while the second attribute has a range of values [0, 9] that varies from 0 to 9. Using the correlation between the attribute values as shown in graph 401, a clustering analysis may be performed using the attributes values in order to find an optimal splitting edge or line for splitting the given extent.

In an example, a clustering algorithm that defines two groups or clusters of records needed for defining or populating the respective sub-extents of the given extent may be used. By applying the clustering algorithm on the records of the given extent the splitting or separating lines 407 may be obtained as shown on the graph 401. Using the resulting separating lines, the two sub-extents of the given extent can be obtained, wherein the first sub-extent has a range of values [1, 7] of the first attribute and a range of values [3, 9] of the second attribute. The second sub-extent has a range of values [8, 20] of the first attribute and a range of values [0, 9] of the second attribute. An example clustering algorithm may include a distribution-based clustering or density-based clustering.

The resulting two sub-extents may be checked using the following function to determine whether the splitting is optimal or not. If, for example, the splitting is not optimal, the splitting may be abandoned or not be performed or another splitting may be retried.

The function is defined as follows for an attribute z1 being a 32 bit integer (f may be adapted for other integer types):

$$f(z1_{min}, z1_{max}) = \frac{z1_{max} - z1_{min}}{2^{32}}$$

Where $z1_{max}$ ($z1_{min}$) indicates maximum (minimum) values of the attribute z1. The $2^{32}$ refers to the maximum integer number that can be used or stored. The function f may be evaluated for the given extent before splitting (to obtain value f1) and may be defined for a resulting, e.g. two sub-extents, to obtain values f2 and f3. The values f2 and f3 may be compared with f1 and based on the comparison it may be determined whether the splitting is optimal or not. For example, if one or both values f2 and f3 are smaller than f1 then it may be determined that the splitting is optimal and may thus be maintained or used.

In another example of multiple attributes, e.g. z1 and z2, where z1 is an integer and z2 is a boolean variable, the function f may be defined as follows:

$$f(z1_{min}, z1_{max}, z2_{min}, z2_{max}) = \frac{z1_{max} - z1_{min}}{2^{32}} + (b(z2_{max}) - b(z2_{min}))$$

Where b(z)=0 for false, and b(z)=1 for true. The $z2_{max}$ ($z2_{min}$) indicates the maximum (minimum) values of the second attribute, which may be a boolean variable for which false may indicate a minimum value, and true may indicate a maximum value. The function f may be evaluated as described above for determining whether the splitting is optimal or not.

An example of merging extents is also illustrated in FIG. 4. FIG. 4 depicts a graph 411 showing correlation between attribute values 413 of the first attribute and attribute values 415 of the second attribute of data records of multiple extents. For example, two extents 417A and 417B are illustrated. The extent 417A has a frequency of read access of 6% while extent 417B has a frequency of read access of 7%. Thus, the two extents fulfil the condition as described above according to which their associated access frequencies are smaller than the predefined frequency threshold (e.g. 10%). In other words, the two extents constitute a candidate pair of extents that can be merged. Before, performing the merging of the two extents 417A, 417B, an additional or alternative condition may be verified, namely, those two extends may be merged if the area of symmetric difference is proportional to the difference between desired reads or accesses frequency level. This may be verified using the following formula:

$$\frac{|ext1 \Delta ext2|}{|ext1 \cup ext2|} = \frac{K - avg(ext1_{freq}, ext2_{freq})}{K}$$

Where | . . . | operator is the velocity operator, ext1 is first extent 417A, ext2 is second extent 417B, K is desired level of frequency of reads for an extent e.g. the predefined frequency threshold, and $ext1f_{req}$, $ext2f_{req}$ is real frequency of the reads on first and second extents respective.

The symmetric difference of ext1 and ext2, ext1Δext2, is the set of elements which are in either of ext1 or ext2 but not in their intersection. The union of ext1 and ext2, ext1 ∪ext2, is a collections of the set of elements which are in both ext1 and ext2.

For example, the above formula may be evaluated and compared to a given threshold in order to decide to merge or not to merge the extents 417A, 417B.

As with the splitting, the resulting merged extent may be checked using the function f to determine whether the merging is optimal or not. If for example the merging is not optimal the merging may be abandoned or not be performed.

In another example, a computerized method for processing data extents in a database management system. The method includes storing entries of a table on a set of data extents, maintaining a piece of attribute value information for each data extent, the attribute value information reflecting the min/max values of at least one attribute of the entries stored in the respective extent, deciding to scan the data extents in connection with query processing based on the attribute value information, monitoring how often the data extents are scanned by queries, resulting in a first set of data extents that are frequently read and a second set of data extents that are rarely read; determining for at least a first data extent of the first set, a first metric reflecting whether splitting the first data extent into first sub-extents would increase query processing efficiency, determining for at least two data extents of the second set, a second metric reflecting whether merging the at least two data extents would increase query processing efficiency, considering splitting and/or merging the data extents based on the determined first and second metric values.

Figure 5:
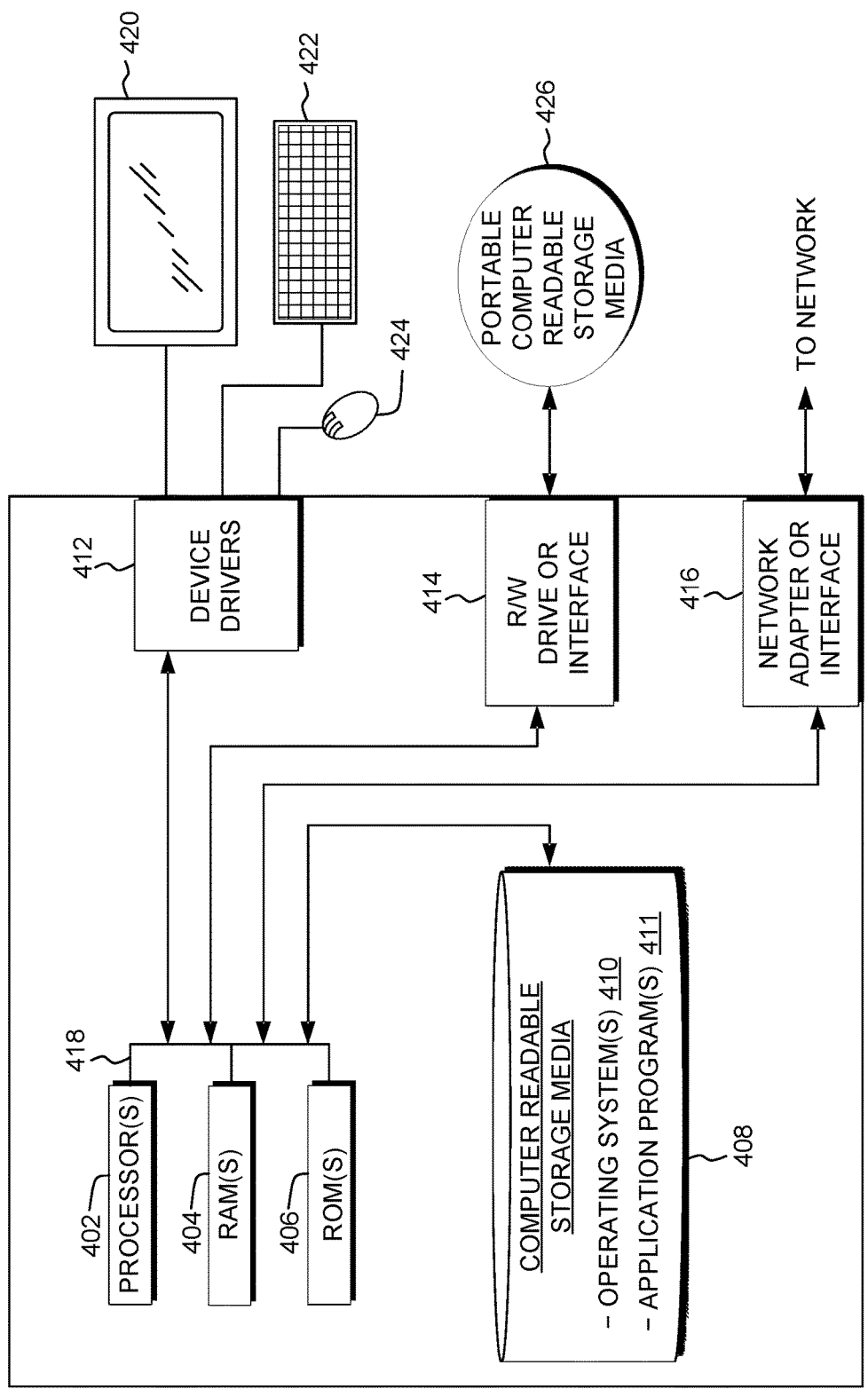
FIG. 5 is a block diagram of internal and external components of computers and servers depicted in FIG. 1, in accordance with an embodiment of the present invention.

Referring now to FIG. 5, a block diagram of components of a computing device, such as the client computer 102 or the server computer 104, of the system 100 of FIG. 1, in accordance with an embodiment of the present invention is shown. It should be appreciated that FIG. 5 provides only an illustration of an implementation and does not imply any limitations with regard to the environments in which different embodiments may be implemented. Many modifications to the depicted environment may be made.

The computing device may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, a method for optimization of query processing of data extents, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include a R/W drive or interface 414 to read from and write to one or more portable computer readable storage media 426. Application programs 411 on the computing device may be stored on one or more of the portable computer readable storage media 426, read via the respective R/W drive or interface 414 and loaded into the respective computer readable storage media 408.

The computing device may also include the network adapter or interface 416, such as a TCP/IP adapter card or wireless communication adapter (such as a 4G wireless communication adapter using OFDMA technology). Application programs 411 on the computing device may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may include copper wires, optical fibers, wireless transmission, routers, firewalls, switches, gateway computers and/or edge servers.

The computing device may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for optimization of query processing of data extents, the method comprising:
    storing entries of a table on a set of data extents;
    maintaining attribute value information for each data extent of the set of data extents, the attribute value information comprising a minimum value and a maximum value of an attribute of the entries stored in the respective extent;
    determining a first metric of a first data extent of the set, wherein the first metric utilizes the attribute value information of the first data extent, to determine a split of the first data extent into a first sub-extent, and a second sub-extent, will increase a query processing efficiency;
    splitting the first data extent into a first sub-extent and a second sub-extent based on the determined first metric;
    performing a clustering analysis using the attribute value information of the set of data extents to define the first sub-extent and the second sub-extent;
    confirming the splitting was optimal based on a function calculated for the first data extent, the first sub-extent and the second sub-extent:

$$f(z1_{min}, z1_{max},) = \frac{z1_{max} - z1_{min}}{2^{32}},$$

where $z1_{max}$ ($z1_{min}$) indicates maximum (minimum) values of the attribute value for the first data extent, the first sub-extent, and the second sub-extent, where z1 is a 32 bit integer, wherein the splitting is optimal if a value of the function for the first sub-extent and a value of the function for the second sub-extent are both less than a value of the function for the first data extent;
    determining an attribute value information of the first sub-extent and determining an attribute value information of the second sub-extent;
    determining a second metric of a second data extent of the set and a third data extent of the set, wherein the second metric utilizes the attribute value information of the second data extent and the third data extent, to determine a merge of the second data extent and the third data extent will increase the query processing efficiency;
    merging the second data extent into the third data extent based on the determined second metric; and
    updating the attribute value information of the second data extent.

2. The method of claim 1, wherein determining the first metric depends on a number of previous read queries of a portion of entries in the first data extent, and determining the number of previous read queries is smaller than a predefined portion threshold.

3. The method of claim 2, wherein splitting the first data extent into a first sub-extent and a second sub-extent is performed such that the portion of read entries is stored in a single sub-extent of the first sub-extents.

4. The method of claim 1, wherein the first metric depends on a frequency of read access of the first data extent, and determining the frequency is higher than a predefined frequency threshold.

5. The method of claim 1, further comprising:
   determining a read frequency of queries of the first data extent is greater than a first threshold; and
   determining a read frequency of the second data extent and of the third data extent is less than a first threshold.

6. The method of claim 5, wherein determining the second metric further comprises:
   determining a difference in a read frequency of the second data extent and a read frequency of the third data extent is less than a predefined maximum value.

7. The method of claim 1, wherein determining the second metric further comprises:
   determining a frequency of read access of the third data extent is less than a predefined frequency threshold; and
   determining a frequency of read access of the fourth data extent is less than the predefined frequency threshold.

8. The method of claim 7, further comprising:
   determining an overlap range of the attribute value of the third extent and the attribute value of the fourth extent is greater than a predefined range.

9. The method of claim 1, wherein determining the second metric further comprises:
   determining an overlap range of the attribute value of the third extent and the attribute value of the fourth extent is greater than a predefined range.

10. The method of claim 1, wherein determining the first metric further is based on a clustering algorithm using attribute value information of the entries of the first data extent.

11. The method of claim 1, wherein the set of data extents comprises a hierarchical data structure, and a hierarchical data container of the merged second data extent and third data extent, is a higher hierarchical level of both the second data extent and the third data extent, wherein the data container comprises attribute value information of the merged second data extent and third data extent; and
    deleting the attribute value information of the third data extent.

12. The method of claim 11, further comprising:
    changing a hierarchy level of the data container to an extent hierarchy level.

* * * * *